US012475492B2

(12) United States Patent
Thanganathan et al.

(10) Patent No.: US 12,475,492 B2
(45) Date of Patent: Nov. 18, 2025

(54) SELECTIVE SYNCHRONIZATION IN A CLOUD MARKETPLACE

(71) Applicant: Zoho Corporation Private Limited, Kanchipuram District (IN)

(72) Inventors: Sathish Kumar Thanganathan, Singaperumal Koil (IN); Gowthaman Ramureddy, Mettur (IN); Praseetha Navaneethan, Lakshmipuram (IN); Priyadharshini S, Polur (IN); Priyanka Sudhakara, Vanagaram (IN); Punithavathi Palani, Chennai (IN); Sudheer A. Grandhi, Pleasanton, CA (US)

(73) Assignee: Zoho Corporation Private Limited, Kanchipuram (IN)

( * ) Notice: Subject to any disclaimer, the term of this patent is extended or adjusted under 35 U.S.C. 154(b) by 285 days.

(21) Appl. No.: 18/140,668

(22) Filed: Apr. 28, 2023

(65) Prior Publication Data

US 2023/0377011 A1    Nov. 23, 2023

Related U.S. Application Data

(60) Provisional application No. 63/358,328, filed on Jul. 5, 2022.

(30) Foreign Application Priority Data

May 18, 2022    (IN) .............................. 202241028535

(51) Int. Cl.
G06Q 30/00       (2023.01)
G06Q 10/087      (2023.01)
G06Q 30/0601     (2023.01)

(52) U.S. Cl.
CPC ....... *G06Q 30/0607* (2013.01); *G06Q 10/087* (2013.01)

(58) Field of Classification Search
CPC .............................................. G06Q 30/06–08
See application file for complete search history.

(56) References Cited

U.S. PATENT DOCUMENTS 9,501,762 B2    11/2016   Babenko et al.
9,507,842 B2 *  11/2016   Knoll ...................... G06F 16/27
(Continued)

OTHER PUBLICATIONS

Facebook, "How do I edit or delete my listing on Facebook Marketplace?," facebook.com/help/514314075439323, 2 pages.
(Continued)

*Primary Examiner* — Ethan D Civan
(74) *Attorney, Agent, or Firm* — Silicon Edge Law Group LLP; Arthur J. Behiel

(57) ABSTRACT

A cloud marketplace includes a network of data centers that collectively allow users to search and purchase products, including applications and extensions to applications. Each data center supports a marketplace module that executes on computing resources to offer users the products and receive and send product metadata descriptive of the products. Each product has a distribution list which specifies one or more data centers as a potential destination to list the product. The distribution list supports region-specific synchronization of products and product listings and can be updated automatically responsive to region-specific policies or regulations to list, delist, or relist products in one or more regions.

29 Claims, 8 Drawing Sheets

(56) References Cited

U.S. PATENT DOCUMENTS

| | | | |
|---|---|---|---|
| 9,805,402 B1 | 10/2017 | Maurer et al. | |
| 11,416,888 B1* | 8/2022 | Walker | G06Q 30/0607 |
| 2002/0156688 A1* | 10/2002 | Horn | G06Q 30/0601 |
| | | | 705/28 |
| 2005/0034164 A1* | 2/2005 | Sano | H04N 21/47202 |
| | | | 348/E7.071 |
| 2010/0217654 A1 | 8/2010 | Keller et al. | |
| 2012/0102050 A1 | 4/2012 | Button et al. | |
| 2016/0191651 A1* | 6/2016 | Balakrishnan | H04L 67/2895 |
| | | | 709/219 |
| 2018/0053163 A1 | 2/2018 | Khanani | |
| 2018/0075502 A1* | 3/2018 | Dika | G06F 16/90335 |
| 2018/0191662 A1* | 7/2018 | Weng | H04L 51/52 |
| 2018/0336607 A1 | 11/2018 | Gasgow et al. | |
| 2020/0020004 A1 | 1/2020 | Metnick | |

OTHER PUBLICATIONS

Intellectual Porperty India, Examination report under sections 12 & 13 of the Patents ACT, 1970 and Patent Rules, 2003, in Indian application 202041033562, dispatched Sep. 28, 2022, 6 pages.

Lokhande, "Administering Oracle Access Management, Ch. 19, Synchronizing Data in a Multi-Data Center," published by Oracle Corporation and downloaded from https://docs.oracle.com/en/middleware/idm/access-manager/12.2.1.3/aiaag/synchronizing-data-multi-data-center.html#GUID-B85C3CE2-577B-4C83-A0A1-6E4FE030C579 on Jun. 10, 2021 but dated Jan. 2021, 14 pages.

Murdock, "Cloud Computing Future Web, Says Shopify Exec.," Practical Ecommerce, May 5, 2011, 5 pages.

Fincher, "Opportunities and Advantages of Cloud Technologies for Ecommerce, Nicholas Fincher," Semrush Blog, May 6, 2014, 6 pages.

Casey, "Remove App from Marketplace?," Stack Overflow, https://stackoverflow.com/questions/47142917/remove-app-from-marketplace, Nov. 6, 2017, 2 pages.

Tolson, "Data Sovereignty and the GDPR; Do You Know Where Your Data Is?," Archive 360, downloaded from https://www.archive360.com/blog/data-sovereignty-and-the-gdpr-do-you-know-where-your-data-is on Jun. 10, 2021 but dated Feb. 14, 2019, 10 pages.

Wikipedia entry entitled "RSA (cryptosystem)," retrieved from https://en.wikipedia.org/w/index.php?title=RSA_(cryptosystem)&oldid=1070640582, last edited on Feb. 8, 2022 (18 pages).

Wikipedia entry entitled "Distributed File System (Microsoft)," retrieved from https://en.wikipedia.org/w/index.php?title=Distributed_File_System_(Microsoft)&oldid=1049113963, last edited on Oct. 9, 2021 (4 pages).

Wikipedia entry entitled "Microsoft Azure," retrieved from https://en.wikipedia.org/w/index.php?title=Microsoft_Azure&oldid=1069334858, last edited on Feb. 1, 2022 (15 pages).

Wikipedia entry entitled "Data Center," retrieved from https://en.wikipedia.org/w/index.php?title=Data_center&oldid=1061942713, last edited on Dec. 25, 2021 (21 pages).

Wikipedia entry entitled "JSON," retrieved from https://en.wikipedia.org/w/index.php?title=JSON&oldid=1070847316, last edited on Feb. 9, 2022 (11 pages).

Wikipedia entry entitled "SQL," retrieved from https://en.wikipedia.org/w/index.php?title=SQL&oldid=1070408880, last edited on Feb. 7, 2022 (15 pages).

Wikipedia entry entitled "Universally Unique Identifier," retrieved from https://en.wikipedia.org/w/index.php?title=Universally_unique_identifier&oldid=1068569982, last edited on Jan. 29, 2022 (11 pages).

Encyclopaedia Britannica, "cache memory," May 20, 2021, 1 page.

Encyclopaedia Britannica, "database management system," Jun. 24, 2021, 1 page.

Sonu Kumar, "Examination report under sections 12 & 13 of the Patents Act, 1970 and the Patents Rules, 2003." Intellectual Property India, Apr. 7, 2025, 6 pages.

* cited by examiner

SELECTIVE SYNCHRONIZATION IN A CLOUD MARKETPLACE

CROSS-REFERENCE TO RELATED APPLICATIONS

This application claims the benefit of U.S. Provisional Application 63/358,328 filed 5 Jul. 2022 and entitled "Selective Synchronization in a Cloud Marketplace" and Indian Provisional Application 202241028535 filed 18 May 2022 and entitled "Selective Synchronization in Cloud Marketplace," which are incorporated herein by reference in their entirety.

TECHNICAL FIELD

Embodiments of the present disclosure relate generally to data processing and, more particularly, but not by way of limitation, to methods and systems for managing regional differences between data centers in a cloud marketplace.

BACKGROUND

A cloud marketplace (or e-commerce marketplace) is an online store with which users can search and purchase physical and media products, such as movies, music, books, applications (apps), app extensions, physical items, and services. Cloud marketplaces can be maintained on geographically distributed data centers (DCs), each a repository that houses computing facilities like servers, routers, switches, and firewalls, as well as supporting components like backup equipment, fire-suppression facilities, and air conditioning. Businesses can service a global customer base via a networked collection of regional DCs.

Each data center includes one or more databases that are synchronized across the data centers so that users have access to some of the same data. For example, apps and related information, such as user reviews and software updates, should be equally available from any data center within a cloud marketplace. Synchronization is complicated because different regions are subject to different and changing regulatory frameworks, and data transfer and sharing regulations limit sharing between regions.

SUMMARY

Detailed are methods and systems for managing regional differences between data centers in a cloud marketplace. A network of data centers that together enable users to browse and purchase items, including apps and extensions to apps, is referred to as a cloud marketplace. Each cloud marketplace includes a data center comprising a marketplace module that utilizes computer resources to receive and send product information. The Marketplace has a distribution list for each product that lists one or more data centers as potential destinations for the product to be included. The distribution list can be automatically updated in response to regional policies or regulations and supports synchronization of products and product listings by region.

DETAILED DESCRIPTION

Figure 1:
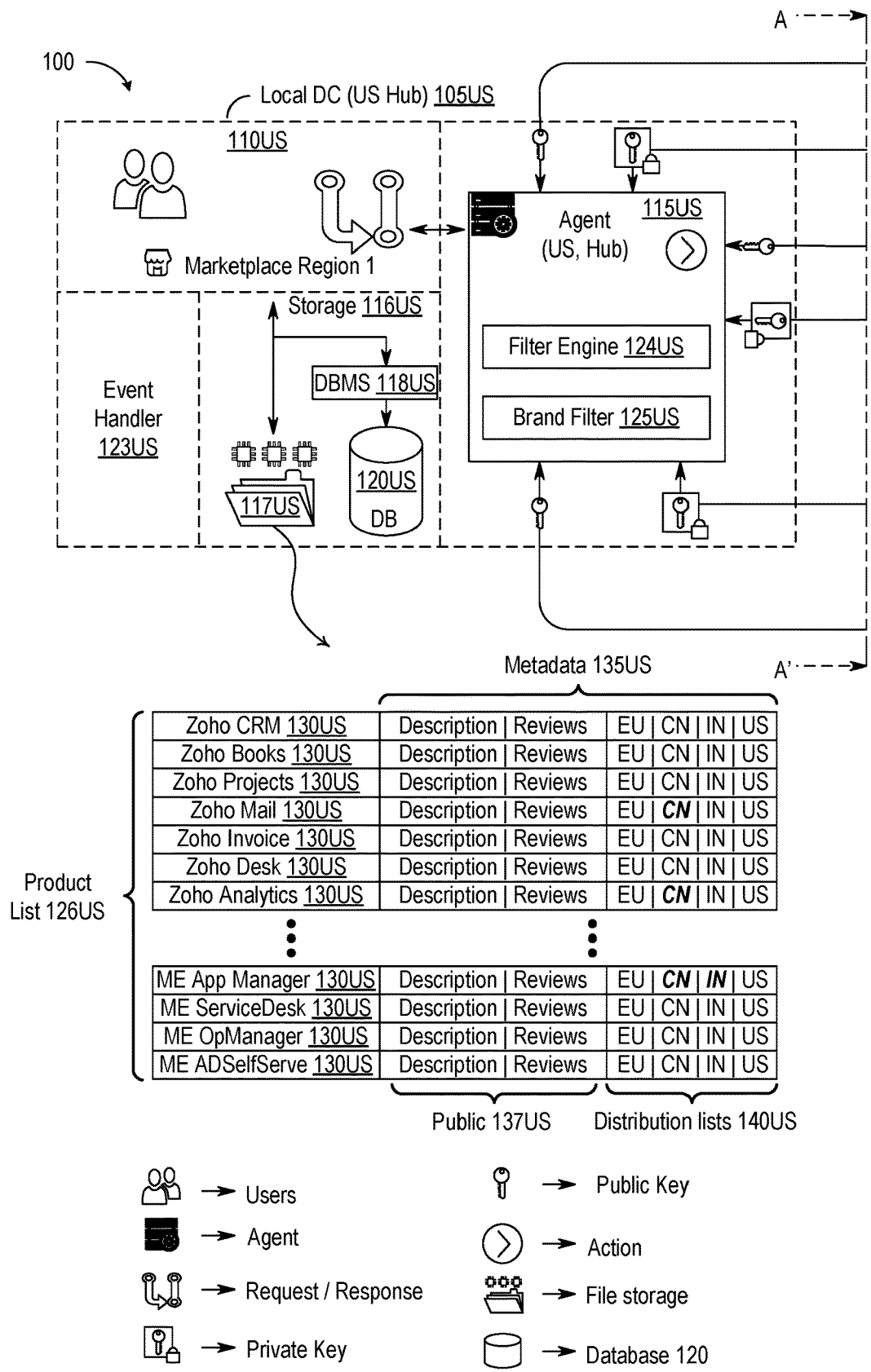
FIG. 1 depicts a network architecture 100 for a cloud or e-commerce marketplace, an online store with which users can purchase physical and media products and services.
Figure 1:
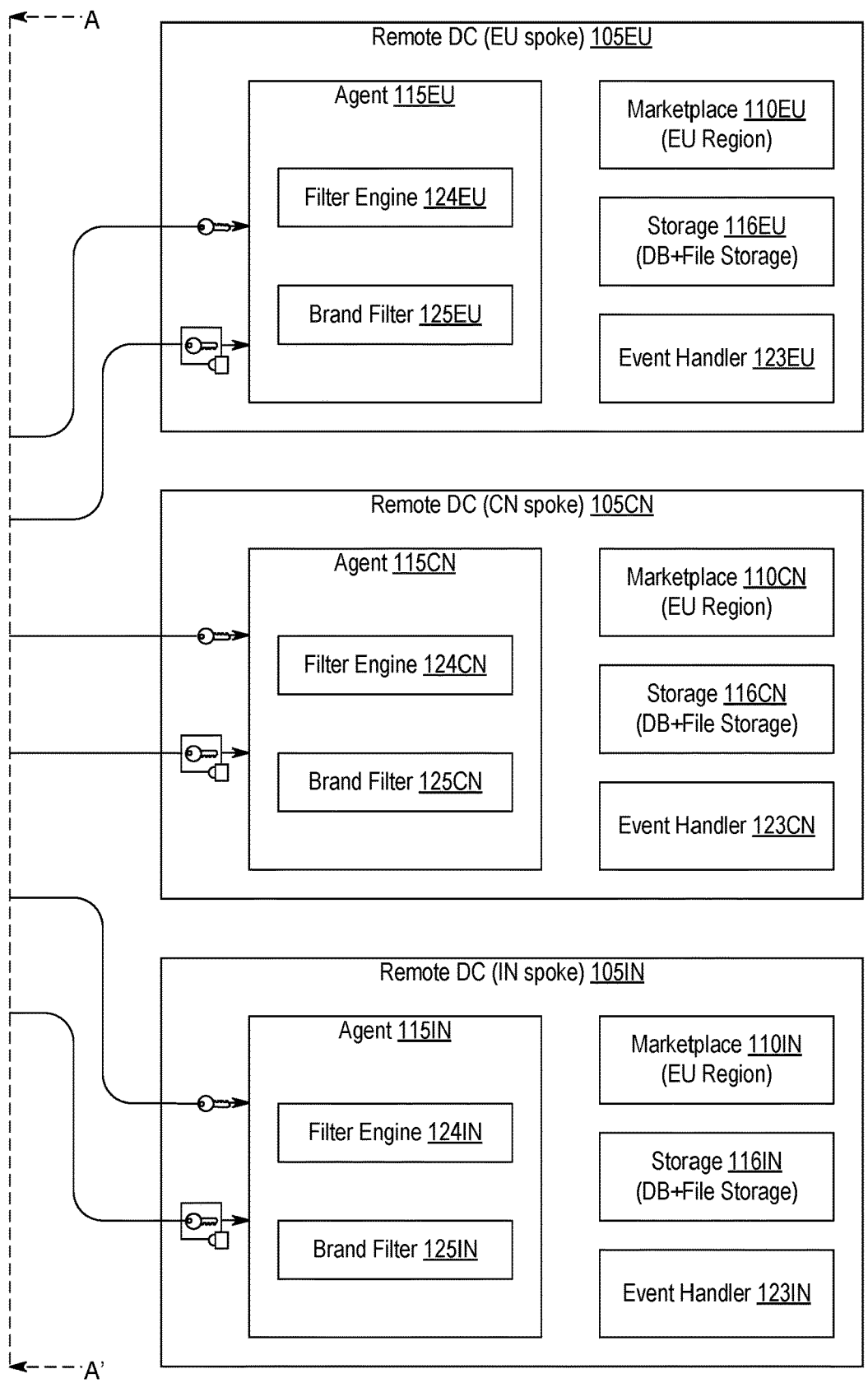

FIG. 1 depicts a network architecture 100 for a cloud or e-commerce marketplace, an online store with which users can purchase physical and media products and services. Media products include movies, music, books, applications (apps), and app extensions. Apps and app extensions, in turn, support e.g. client-relationship management (CRM), sales, subscriptions, meetings, and various forms of electronic messaging. Architecture 100 includes geographically distributed data centers (DCs) 105. In this example, architecture 100 includes a local marketplace DC 105US that serves as a network hub for three remote marketplace DCs 105EU, 105CN, and 105 IN. Here and elsewhere, two-letter suffixes on similar element identifiers indicate the regions in which the elements are located. For example, DC 105US is in the United States, DC 105EU is in Europe, DC 105CN is in China, and DC 105 IN is in India. Customers can access the overall marketplace supported by network architecture 100 by interacting with any DC 105 via the Internet.

In one embodiment, architecture 100 implements an e-commerce marketplace framework built on an Asynchronous Web Server Framework (AWSF) of Zoho Corporation Pvt. Ltd. The framework can handle asynchronous data flow across communication networks interconnecting architecturally similar DCs 105. The following discussion focuses on DC 105US. A key at the bottom of FIG. 1 identifies symbols that illustrate network features and functions for storing and communicating information.

DC 105US includes a marketplace module 110US with a software agent 115US, or "agent module," for synchronization of product data and metadata with remoted DCs 105 [EU, CN, IN] in real-time or near real-time to meet customer needs in a timely manner. In this context, a software agent, or just "agent," is a computer program or program module that acts on behalf of another program or module in a relationship of agency. Software agents can transfer data between DCs 105 as needed. A module is a portion of a computer program that encapsulates code and data to implement a particular functionality in service of the larger program. A module has a logical interface that conveys messages to and from other modules.

DC 105US also includes computing resources to execute programs or program modules, resources such as one or more processors with access to memory running an operating system (OS) that supports basic server functionality. DC 105US has or has access to storage 116US with both file storage 117US and a database (DB) 120US, the latter supported by a database management system (DBMS) 118US. Both file storage 117US and DB 120US store product data and metadata. Agent 115US synchronizes product data and metadata in file storage 117US with similar file storage in remote DCs 105, while DBMS 118US synchronizes database 120US with similar databases 120 in remote DCs 105.

Database 120US can be physically remote from the computing resources employed in executing the corresponding agent module 115US and can employ storage that is orders of magnitude slower than main memory and file storage 117US. DBMS scheduling further reduces the relative speed performance of database 120US. Sharing and transfer regulations may forbid the sharing of some product data between DCs. For example, data sharing and transfer regulations such as General Data Protection Regulation (GDPR) and the California Consumer Privacy Act (CCPA) may place restrictions on synchronizing databases. Even if data transfer and sharing is not restricted between databases (e.g. because the data is public, or the databases are not under data transfer and sharing restrictions) shared data may not be synchronized across local and remote databases in time to meet or serve customer needs. An event handler 123US composes messages, including for product metadata updates, for forwarding to the remaining DCs 105.

Agent 115US enables and expedites the sharing of product information that would otherwise be slow or difficult to obtain. Agent 115US includes a filter engine 124US and brand filter 125US. Filter engine 124US automatically manages product listings based on e.g. changing policies or regulations that specify when products or classes of products should be delisted in one or more regions. Delisting may be required due to any characteristic of a product (e.g. the nature or content of the product, the source or destination, in-app purchases, or user reviews). A DC 105 serving as a source of product data or metadata can send out a request to other destination DCs 105 to add, update, or delete product metadata like user reviews, and ratings. Brand filter 125US facilitates brand-wise synchronization across DCs 105.

In another embodiment, filter engine 124US can be independent from marketplace module 110US and capable of crawling through other public marketplaces. Agent 115US facilitates communication between marketplace module 110US and other marketplace modules. For example, a filter engine separate from the marketplace module could operate independently, as a third-party entity e.g. regulatory entity, crawling geographically distributed marketplaces. Agent 115US facilitates communication between marketplace module 110US and other marketplace modules.

File storage 117US stores a product list 126US listing every product known by DC 105US to be available among local and remote DCs 105. Some or all this information can likewise be stored in database 120US. In this example, product list 126US includes entries 130US for seven apps available under the brand name ZOHO and four apps available under the brand name MANAGE ENGINE (ME). Each product entry 130US has a unique product identifier "ProductID" (not shown) and metadata 135US, which in turn includes publicly available product metadata 137US (e.g. a description of the product and user reviews) and private fields of distribution parameters 140US that indicate the regions in which the product is available for distribution. Each set of distribution parameters 140US in this example lists the four regions of DCs 105 in FIG. 1 by country code. Bold, italic entries indicate regions in which a given product is not available. For example, app Zoho Mail is not available for distribution in China (CN) and ME App Manager is unavailable in China and India (IN). Some or all distribution parameters 140 can be public in one or more DCs 105.

Local product list 126US can list the same products as remote product lists (e.g. 126IN). However, local distribution parameters 140US can differ from any or all remote distribution parameters, and these differences can change with regional regulatory updates. Developers and sellers can also require region-specific updates to metadata 135US that reflect differences or changes in e.g. language, product, delivery, pricing, or logistics. Local DC 105US cannot necessarily read distribution lists 140 in remote DCs 105, however, due to e.g. regulations that place restrictions on data synchronization. For example, were the remote DC 105EU in Europe to update a distribution list 140EU for a listed product to preclude distribution of a stock-trading app in China, regulatory restrictions may prevent US DC 105US from receiving the requisite updated distribution parameters. The product barred from distribution in China could thus remain available to Chinese purchasers via US DC 105US.

Agent 115US addresses this synchronization problem by crawling published remote product information to populate product metadata 137US. Local agent 115US includes a web crawler, a program module that reads the contents of product web pages of remote DCs 105EU, 105CN, and 105IN. The crawler extracts public information from websites hosted by remote DCs to gather information about products on sale, information such as the product name, description, price, availability, and user reviews. Agent 115US uses this information to populate local product metadata 137US and can add products to product list 126US as they appear. Newly promulgated legislation and other region- or product-specific updates can then be applied to the products of product list 126US based upon consideration of the updated public portion 137US of local metadata 135US. For example, should updated metadata 137US indicate that one of products 130US cannot be sold in China, the distribution list 140US associated with that product can be updated to note this fact, allowing DC 105US to forbid subsequent attempts and distribution. In the example of a stock-trading app barred from distribution in China, agent 115US locates the stock-trading app by crawling public metadata to identify the barred app, updates local public metadata 137US with any changes, and updates local distribution list 140US as necessary to bar Chinese distribution. The affected product can be delisted entirely or omitted from web resources made available responsive to queries from IP addresses sourced in a selected region or regions. Regulatory changes and concomitant distribution-list updates can be initiated within any region and applied to any other. Regional differences can likewise reflect logistics and can therefore consider logistical information used to coordinate delivery of product offerings, information that can identify e.g. sellers, purchasers, inventory, material, equipment, and locations.

Local DC 105US is a US DC that serves as a hub in a spoke-hub network. Other network architectures, such as peer-to-peer, can be used in other embodiments, and other DCs 105 can serve as the only or one of a number of local DCs.

A DC 105 in which a ProductID is hosted for the first time by a vendor is called an "origin" DC. Such a vendor can select a set of regional "destination" DCs 105 that will host the same product. For example, a vendor might list an app for sale via US DC 105US—the origin DC for the app—and specify one or more additional regions in which the app is to be made available. DC 105US lists the app in product list 126US accompanied by public metadata 137US descriptive of the app and a distribution list 140US identifying the origin and destination DCs 105 for the regions in which the app is to be offered for sale. A marketplace administrator of the origin DC 105 can curate or otherwise manage product distribution list 140 to override vendor selections.

A filter engine 124 in each agent 115 automatically manages the listing and delisting of products responsive to changing policies, regulations, or product characteristics (e.g. the source of or nature of a product, product content, in-app purchases, and user reviews). An origin DC 105 can request destination DCs to add, update, or delete products or product metadata like user reviews, ratings, etc. A brand filter 125 of the origin DC 105 can segregate or filter requests based on brand. In the example of FIG. 1, brand filter 125US in origin DC 105US segregates requests made on behalf of brands Zoho and Manage Engine (ME), both of which are represented in product list 126US.

Users of marketplace DCs 105 include product developers, sellers, and buyers. Developers and sellers can upload product descriptions and other product metadata. Buyers, e.g. via an Internet connection, can peruse product offerings (e.g. items for sale or products on offer via the marketplace DCs). Buyers interact with DCs 105 to purchase products and can read and submit feedback (e.g. ratings and reviews) for distribution and storage as additional product metadata. This form of metadata is for publication and can be synchronized among DCs 105.

Any DC 105 in marketplace architecture 100 can receive a metadata update corresponding to any product in product lists 126 collectively. Whichever DC 105 holds an update for distribution in the marketplace framework is a "source" DC; a target of that update is a "destination" DC. Generally, if a product in product list 126 of a source DC has metadata update, the source DC sends the update to the destination DC(s) 105 indicated in the distribution list 140 associated with the product. Each distribution list 140 can identify which DC(s) 105 host the associated product 130, which allows a source DC 105 to limited metadata-update messages to destination DCs 105 that host the product, as identified using the same ProductID.

A source DC 105 can perform selective synchronization to notify destination DCs of e.g. (1) a new product listing or new metadata associated a listed product; (2) an update to product metadata; or (3) a product delisting. According to condition (1), whenever an origin DC 105 hosts a new product 130 on behalf of a user, a distribution list 140 is also created based on the user's selection of one or more region in which the product should be offered for sale. The origin DC 105, acting as a source DC, assigns the product 130 an identifier ProductID and sends the ProductID and related public metadata 137 to the destination DCs called for in the distribution list 140 corresponding to the ProductID. According to condition (2), when any one of DCs 105 in the marketplace framework hosting a common ProductID receives a product-metadata update, the DC 105 with the update acts as a source DC and sends the product metadata update to the destination DCs indicated in the distribution list. According to condition (3), when a source DC 105 receives an instruction to delist a product 130 or is inspired by a regulatory change to delist a product in one or more regions, the source DC updates the local distribution list 140 and sends a delist message to any affected destination DCs 105. In another embodiment, each product has a distribution list of date centers identified by region. When a product is delisted from a region, the respective distribution list is updated to indicate removal of the affected data centers.

Each distribution list 140 can be manually updated by a product vendor or marketplace administrator and can be automatically updated by the filter engine 124 in the associated DC 105. For example, filter engine 125US can crawl through the descriptions of products listed in product list 126US provided on other DCs 105 to check for updates to metadata 137US and update distribution lists 140US accordingly. In a peer-to-peer configuration, the event handler 123 in a source DC can compose a message to each DC 105 in the distribution list 140 for a given product 130. The message includes the ProductID(s) and any corresponding metadata update(s). The agent 115 in the source DC 105 then sends the message to the destination DCs 105 identified in the distribution list 140. In a spoke-hub network, a spoke DC 105 receiving a product-update instruction sends messages to a hub DC 105 to be relayed to any spoke DCs 105 affected by the instruction.

Figure 2:
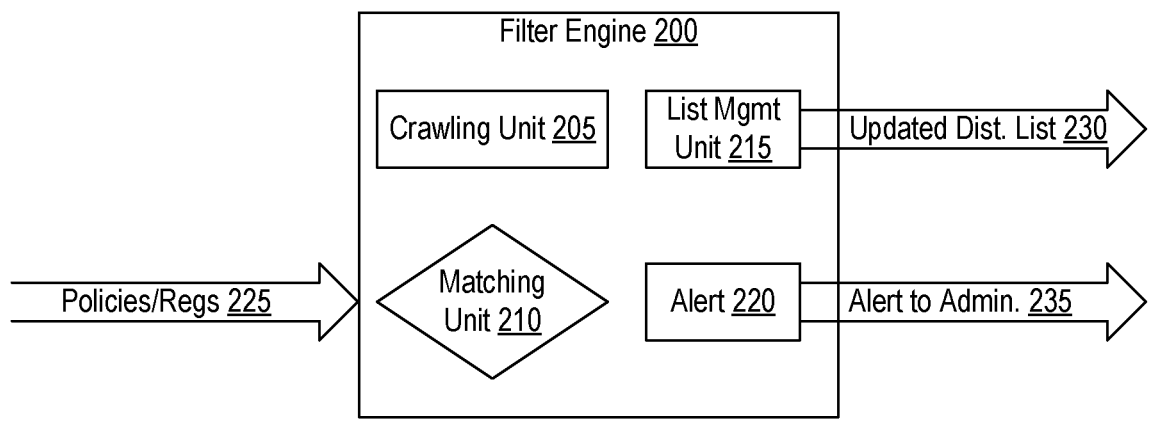
FIG. 2 depicts an embodiment of a filter engine 200 that can be used in each DC 105 as filter engine 124.

FIG. 2 depicts an embodiment of a filter engine 200 that can be used in each DC 105 as filter engine 124. The operation of filter engine 200 is independent to whether the DCs 105 are connected in a peer-to-peer or spoke-hub model. Filter engine 200 can validate product offerings against e.g. policies, regulations, vendor instruction, and marketplace requirements, and can automatically list, delist, and relist products responsive to changes in those policies, regulations, instructions, and requirements. Filter engine 200 updates distribution list 140 to note the region or regions in which a product has been listed, delisted, or relisted. Filter engine 200 enables a delist feature in the distribution list so that the ProductID is delisted from being hosted or listed again in the selective destination DC(s). The ProductID is delisted when its product metadata does not comply with e.g. policies or regulations. The changes in distribution list may trigger (a) the origin DC 105 to delist the product, (b) the agent 115 in the origin DC 105 to send a message alerting others of DCs 105 to the changes, or (c) both.

Filter engine 200 is triggered whenever the respective DC 105 receives a new or changed policy or regulation that may impact one or more products 130. Filter engine 200 includes a crawling unit 205, a matching unit 210, a distribution-list management unit 215, and an alert generator 220. The inputs to filter engine 200 are policies/regulations 225 originating from source or destination regions. The outputs from filter engine 200 are (i) an updated distribution list 230 from management unit 215, and (ii) a notification/alert 235 to a marketplace administrator from alert generator 220.

Crawling unit 205 periodically crawls through local product list 126, scanning product metadata 135 of each product 130. Crawling unit 205 can also crawl through remote product listings on remote DCs 105 to update product metadata posted remotely that may otherwise be locally unavailable. The crawling frequency of filter engine 200 is programmed by a marketplace administrator. In another embodiment, crawling is initiated whenever the local DC 105 receives an update on policies/regulations 225 from e.g. a local or remote DC 105. The crawling unit could be under the control of a regulatory body of the government or a third party with the role of crawling the product listing. Crawling unit 205 obtains product metadata 135 for each product 130. Matching unit 210 matches product metadata 135 with the received update to policies/regulations 225. Matching unit 210 outputs a "matching" decision for each product 130 with metadata 135 that complies with the update, and otherwise issues a "no-match" decision.

Distribution-list management unit 215 handles the process of updating the local distribution list 140 based on "no-match" decisions from matching unit 210. Management unit 215 includes a delist enabler/disabler (not shown). When matching unit 210 outputs a "no-match" decision for a given product 130, the delist enabler updates the local distribution list 140 of the affected product 130 to delist the offered product in one or more regions. Alert generator 220 sends an alert 235 to an administrator of the local DC 105 to inform of the update.

Figure 3:
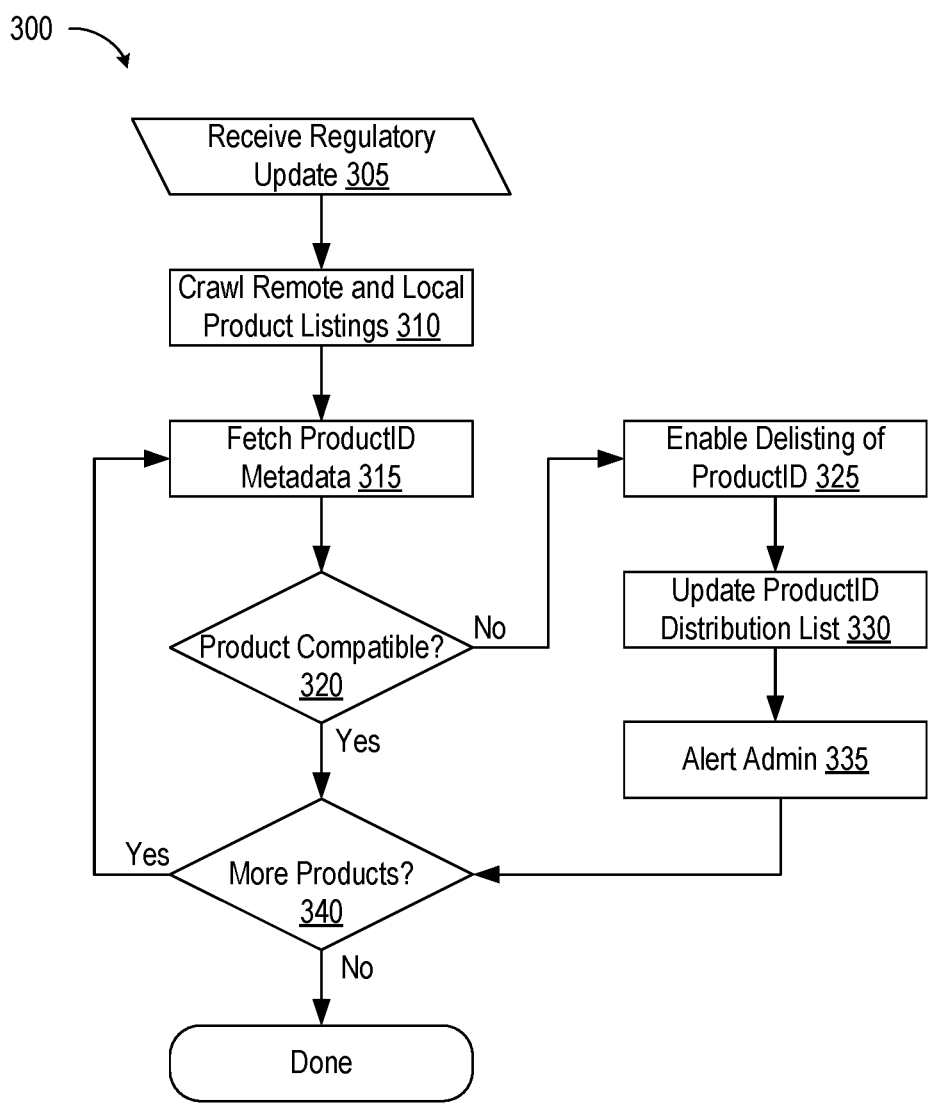
FIG. 3 is a flowchart 300 depicting a process of delisting a product using filter engine 200 of FIG. 2, a process initiated upon receipt of a regulatory update 305.

FIG. 3 is a flowchart 300 depicting a process of delisting a product using filter engine 200 of FIG. 2, a process initiated upon receipt of a regulatory update 305. Crawling unit 205 gathers metadata 135 from the local DC and can crawl product information published by remote DCs to supplement this metadata (310). For each product 130, identified by a unique ProductID, filter engine 200 fetches the corresponding metadata 135 (315) and determines whether that metadata, and therefore the product, is compatible with the regulatory update in one or more region. Per decision 320, if the product is incompatible, list-management unit 215 enables a delisting of the product (325) in the affected region(s). The distribution list 140 of the affected product is updated to note the delisting in any affected region or regions (330) and alert generator 220 sends an alert 335 to an administrator of each affected DC 105. Per decision 340, the process continues if there are more products 130 in the local product list 126.

A marketplace administrator may choose to delist a product for reasons other than regulatory. Filter engine 200 can also check for local changes to public metadata 137 (e.g. user review) so that local agent 115 can message remote DCs 105 with meta-data updates. Such update messages are sent to remote DCs in regions specified by the distribution lists 140 of updated products. Similar updates can be initiated by e.g. receipt of a user review.

Figure 4:
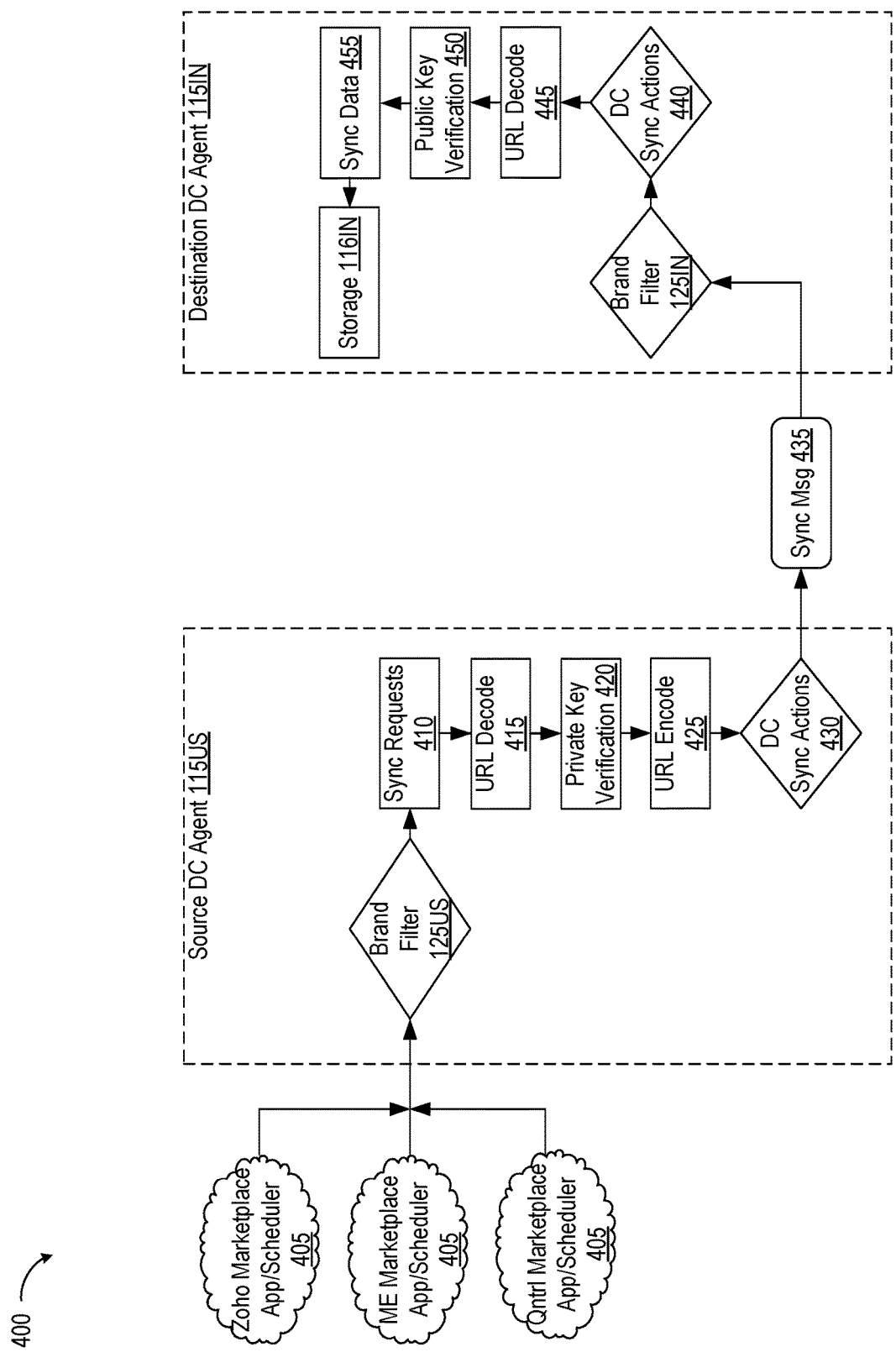
FIG. 4 is a flow diagram 400 illustrating how source agent 115US and destination agent 1151N, both of FIG. 1, employ respective brand filters 125US and 125IN.

FIG. 4 is a flow diagram 400 illustrating how source agent 115US and destination agent 115IN, both of FIG. 1, employ respective brand filters 125US and 125IN. Source DC agent 115US receives brand-specific product and metadata updates from schedulers 405, software tool provided by DCs 105 to allow vendors to automate the deployment and management of products. In this example, schedulers 405 are maintained on behalf of vendors with brand names Zoho, ME, and Qntrl to allow those vendors to introduce products 130 for sale and to add, modify, or delete product metadata 135. Brand filter 125US segregates/filters requests from schedulers 405 based on marketplace brand before forwarding the requests to destination DCs, in this case to destination agent 115IN of DC 105IN. Brand filter 125IN can likewise filter incoming messages based on a brand or brands associated with each message.

Brand filter 125US issues brand-specific synchronization requests 410. Agent 115US decodes these requests (415) and verifies the decoded requests using e.g. private-key authentication (420). Assuming a message is authentic, agent 115US encodes the message URL (425) and initiates synchronization actions (430) that communicate the brand-specific synchronization message 435 to destination DC agent 115IN. Message 435 can update such brand-specific information as company data; product and product details; user membership, ratings, and reviews; extension tags; and extension install/uninstall counts. Brand filter 125IN at the remote DC initiates synchronization actions 440. Destination agent 115IN decodes the URL of message 435 (445), verifies the public key (450), and issues synchronization instructions 455 to storage 116IN. Instructions 455 update product metadata in file storage 117IN and database 120IN (see FIG. 1).

Figure 5:
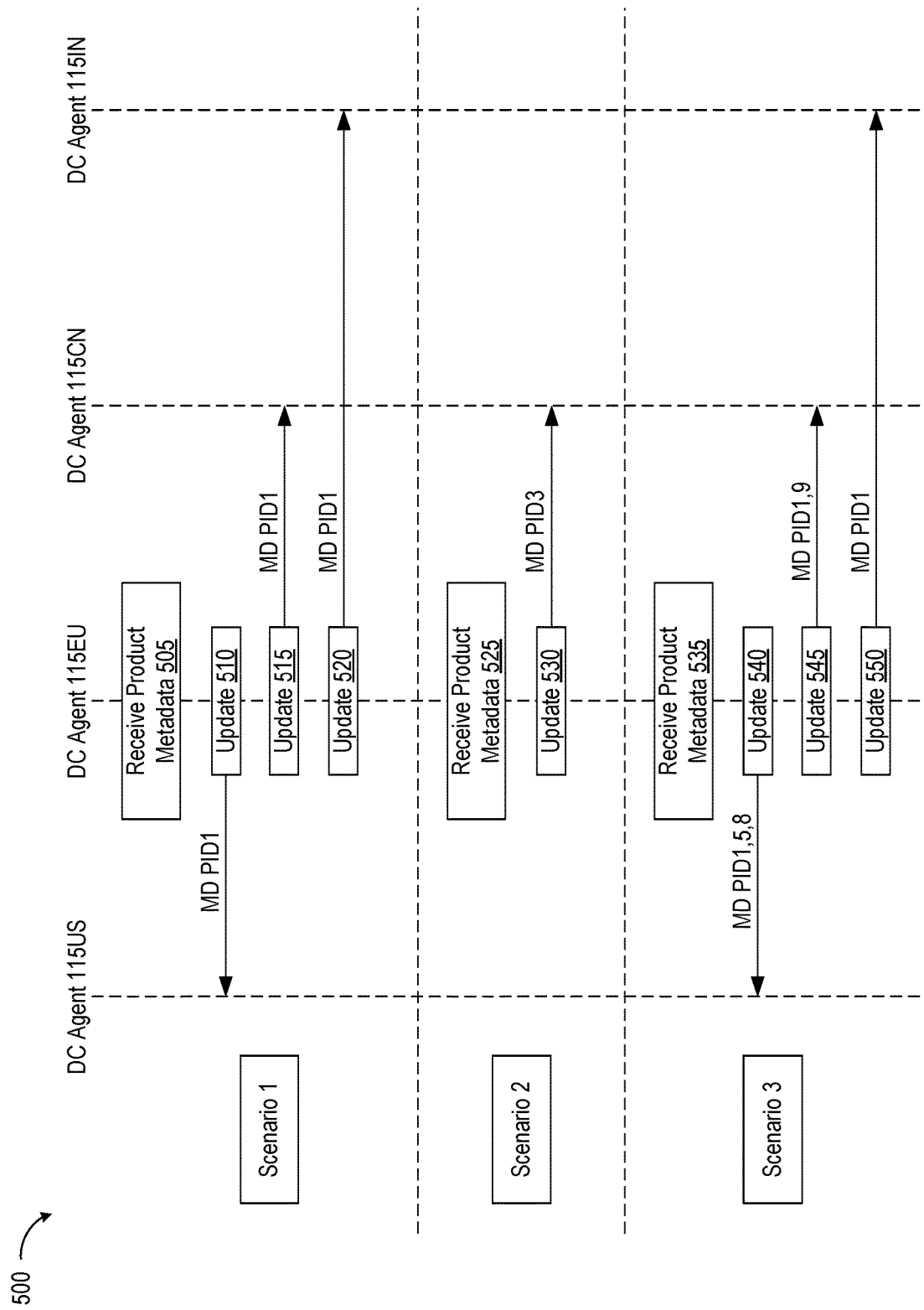
FIG. 5 is a sequence diagram 500 illustrating the timing of operations managed by event handlers 123 to send update messages among the four regional DC agents 115US, 115EU, 115CN, and 1151N introduced in FIG. 1.

FIG. 5 is a sequence diagram 500 illustrating the timing of operations managed by event handlers 123 to send update messages among the four regional DC agents 115US, 115EU, 115CN, and 115IN introduced in FIG. 1. An event handler 123 of a source DC agent 115 creates messages to be sent to selective destination DCs determined from distribution lists 140. The marketplace entity of the source DC 105 may trigger event handler 123 once distribution list 140 is updated by filter engine 124. This update triggers event handler 123 to notify destination DCs 105 about the delisting of product, by ProductID, in the source DC 105.

In the marketplace framework where DCs 105 are interconnected peer-to-peer, the source DC 105 for a metadata update messages the destination DCs 105 identified in the distribution lists 140 of impacted products 130. The metadata-update message can include, for each affected product, the address of each destination DC 105, a command "UPDATE", the ProductID of the affected product, and a product metadata update. Whereas if there is a delist of a product, the source DC 105 can update the same to potential destination DC(s) 105 via a message communicating: the address of each destination DC 105, a command "DELIST", and the ProductID. In an embodiment where DC(s) are interconnected in a spoke-hub model, whenever there is an update or delist of a ProductID in any of the spoke DC(s), the communication message is be sent from the spoke DC to the hub DC and from there distributed to any remaining destination DCs 105.

FIG. 5 illustrates message flow among DC agents 115 interconnected in a peer-to-peer model. In a first scenario Scenario 1, DC agent 115EU receives a metadata update request for a product 130 listed in all the other three regional DCs under ProductID PID1. DC 115EU is the source DC. Agent 115EU issues update messages 510, 515, and 520 to destination DCs 105US, 105CN, and 105IN. These messages convey the requisite metadata updates for product ProductID PID1. Source DC 105EU can update local product list 126EU to list the product and metadata with a distribution list 140 excluding DC 105EU from distribution.

Scenario 2 depicts the message flow among the marketplace DCs where a product of ProductID PID3 is hosted in China alone. Filter engine 124EU receives product metadata (525) for ProductID PID3 and refers to distribution list 140CN mapped to ProductID PID3. Event handler 123EU generates and forwards an update message 530 to DC agent 115CN. Should agent 115EU be unable to access distribution list 140CN, DC agent 115 can send message 530 to every remote DC. Remote DCs 105 hosting product PID3 can respond affirmatively, in which case DC 105EU can update local product list 126EU with ProductID ID3 and the related distribution list 140EU designating remote DC 115CN alone. Agent 115EU can also maintain a local distribution list 140EU associated with product PID3 in part to keep local track of the delisting.

A third scenario, Scenario 3, shows a message flow among marketplace DCs in which a product PID1 is hosted on all DCs; products PID5 and PID8 are hosted on DC 105US and 105EU; and a product PID9 is hosted on DC 105EU and DC 105CN. DC 105EU receives product metadata for the updates (535) and event handler 123EU instigates agent 115EU to issue update messages 540, 545, and 550 to destination DCs 115US, 115CN, and 115IN, respectively. These messages convey the requisite metadata updates, with each message including updates for one or more products. Maintaining local distribution lists 140 for local and remote DCs allows each agent to economize on messaging.

Figure 6:
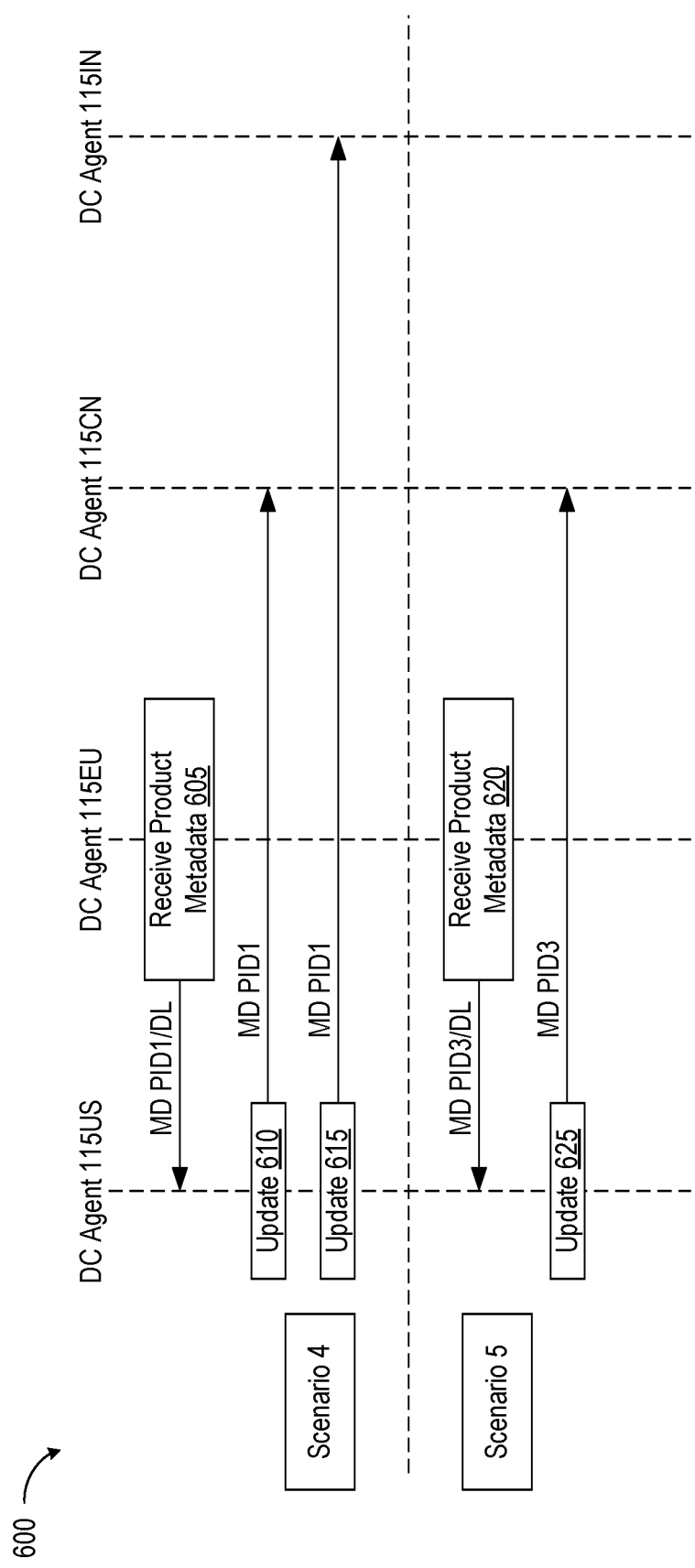
FIG. 6 is a flow diagram 600 illustrating message flow between a source DC agent 115EU, a hub DC agent that acts as a primary agent, and three hub DC agents that act as secondary agents in different geographical regions.

FIG. 6 is a flow diagram 600 illustrating message flow between a source DC agent 115EU, a hub DC agent that acts as a primary agent, and three hub DC agents that act as secondary agents in different geographical regions.

Scenario 4 depicts message flow when there is an update for a ProductID PID1 to be synced across all DCs. In this example, the European DC 105EU is the source that receives product metadata (605) that requires the update. US DC 105US is the hub DC and the remaining DCs the spokes. The product metadata arriving at a spoke DC is sent to DC agent 115US, which updates metadata 135US accordingly and issues update messages 610 and 615 to the remaining spoke DCs. Update messages 610 and 615 can be forwarded in parallel.

Scenario 5 illustrates metadata update messaging among spoke and hub DC agents 115 when there is an update to product metadata associated with a product PID3 that is only listed in DC 105US and DC 105CN. In this example, Europe is the regions of the source DC 105EU so agent 115EU is charged with distributing the update message or messages. The received product metadata, after going through filter engine 124EU and event handler 123EU, is forwarded to hub DC 105US. Hub agent 115US forwards the update message 625 to agent 115CN, China being the only region indicated in distribution list 140EU for product PID3.

Each marketplace has its own regulations, constraints, government policies, etc. When there is a regulation change in any of the marketplaces, a product that was already listed can be delisted from the marketplace. The marketplace entity of the source DC triggers the event handler once the distribution list is updated by the filter engine. This notifies the destination DCs about the delisting of a product in the source DC. Various types of negotiations and status checks with other DCs can be initiated when a product is delisted in local or remote DCs.

Figure 7:
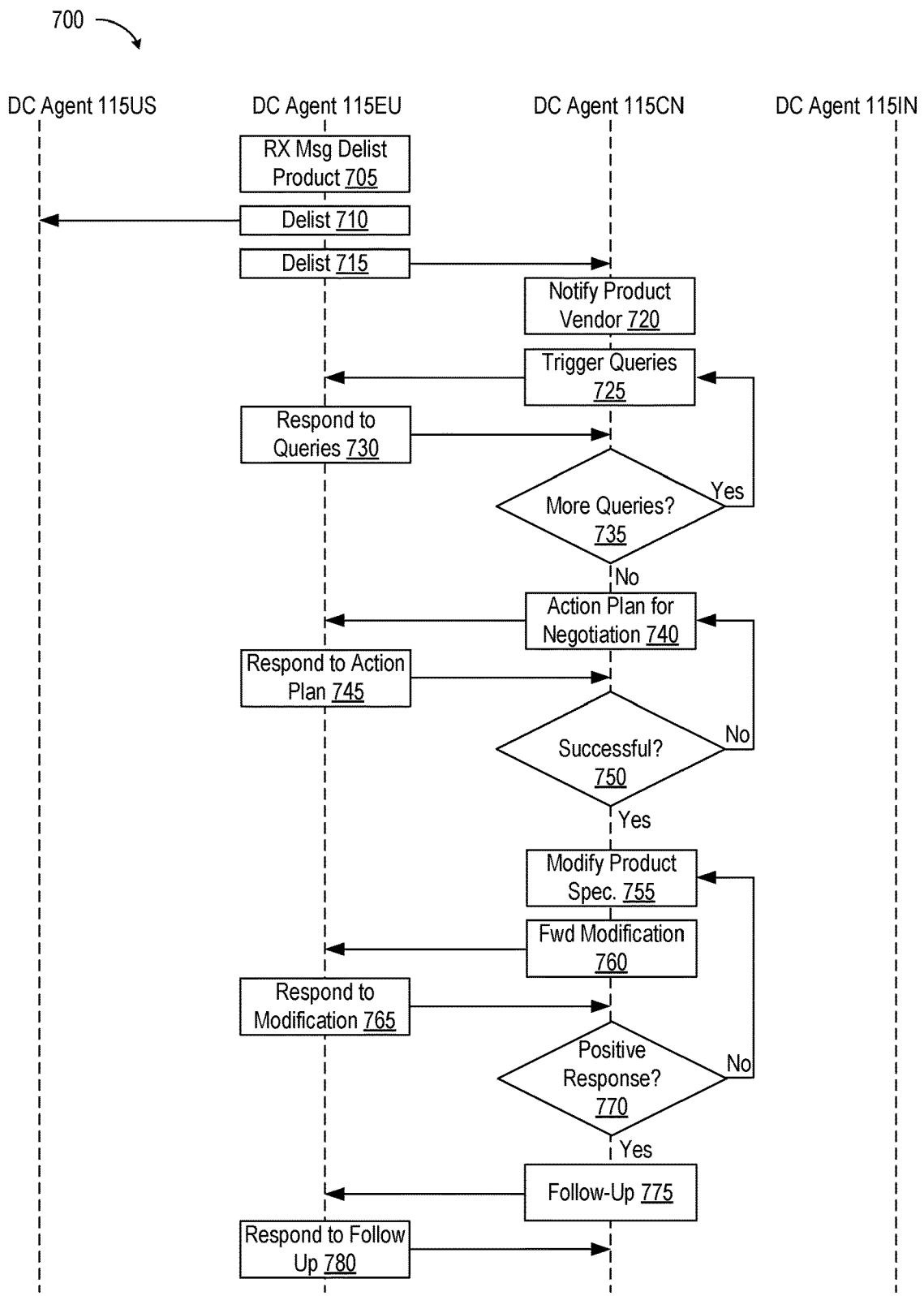
FIG. 7 depicts a delisting process 700 in a marketplace of DCs 105 arranged in a peer-to-peer model.

FIG. 7 depicts a delisting process 700 in a marketplace of DCs 105 arranged in a peer-to-peer model. In this example, European agent 115EU receives a message 705 requesting the delisting of a product offered for sale in the US and EU markets by a vendor in China via the Chinese DC 105CN. Agent 115EU delists the product from local list 126EU and sends a message 710 notifying US agent 115US of the delisting. The Chinese DC 105CN is the origin of the product in this example, so agent 115EU sends a message 715 notifying agent 115CN of the delisting. Source agent 115EU can but is not obliged to relay the reason why the product was delisted.

Message 715 inspires agent 115CN to notify the product's vendor the product's delisting (720). The notification can trigger queries 725 from a vendor interested in understanding or reversing the delisting. Agent 115EU can automatically or with administrative help respond to the queries (730). Once the queries are exhausted, per decision 735, agent 115CN can message agent 115EU an action plan 740 for negotiating an end to the delisting. The action plan of step 740 can include a requirement of product content modification according to the government policy or regulation, an agreement to modify the product specification or availability in conformance with the policy or regulation, a change in in-app purchase restrictions, etc.

Agent 115EU can review the action plan and respond (745) with suggestions for managing the issues, such as to modify the product or product description to address a regulatory problem. Per decision 750, if the negotiation is successful agent 115CN can modify the product (755) in the negotiated manner and forward the modified product or product description to agent 115EU for review (760). If the response is negative, which is to say no agreement is reached, decision 770 returns to step 755 so that the negotiation can continue. If the negotiated change succeeds, agent 115CN follows up (775) with a request to determine when the modified product specification can be relisted. Agent 115EU responds (780) and, while not shown here, filter engine 124EU modifies the products distribution list 140EU to reverse the local delisting and messages remote DC 105US to do the same. Other DCs 105 can likewise be alerted to update their respective distribution lists whether the product is current on offer in their respective regions.

In the foregoing example, the delisting process originates from and is managed by DC that is not the origin of the product under consideration. An origin DC could likewise delist a product due to e.g. non-compliance in the policies/regulations. When there is an update of policies/regulations in the origin DC, the filter engine of the origin DC can update the local distribution list and the marketplace entity of the origin DC can trigger the event handler, once the distribution list is updated, to instigate the local agent to notify the destination DCs to delist the product.

Figure 8:
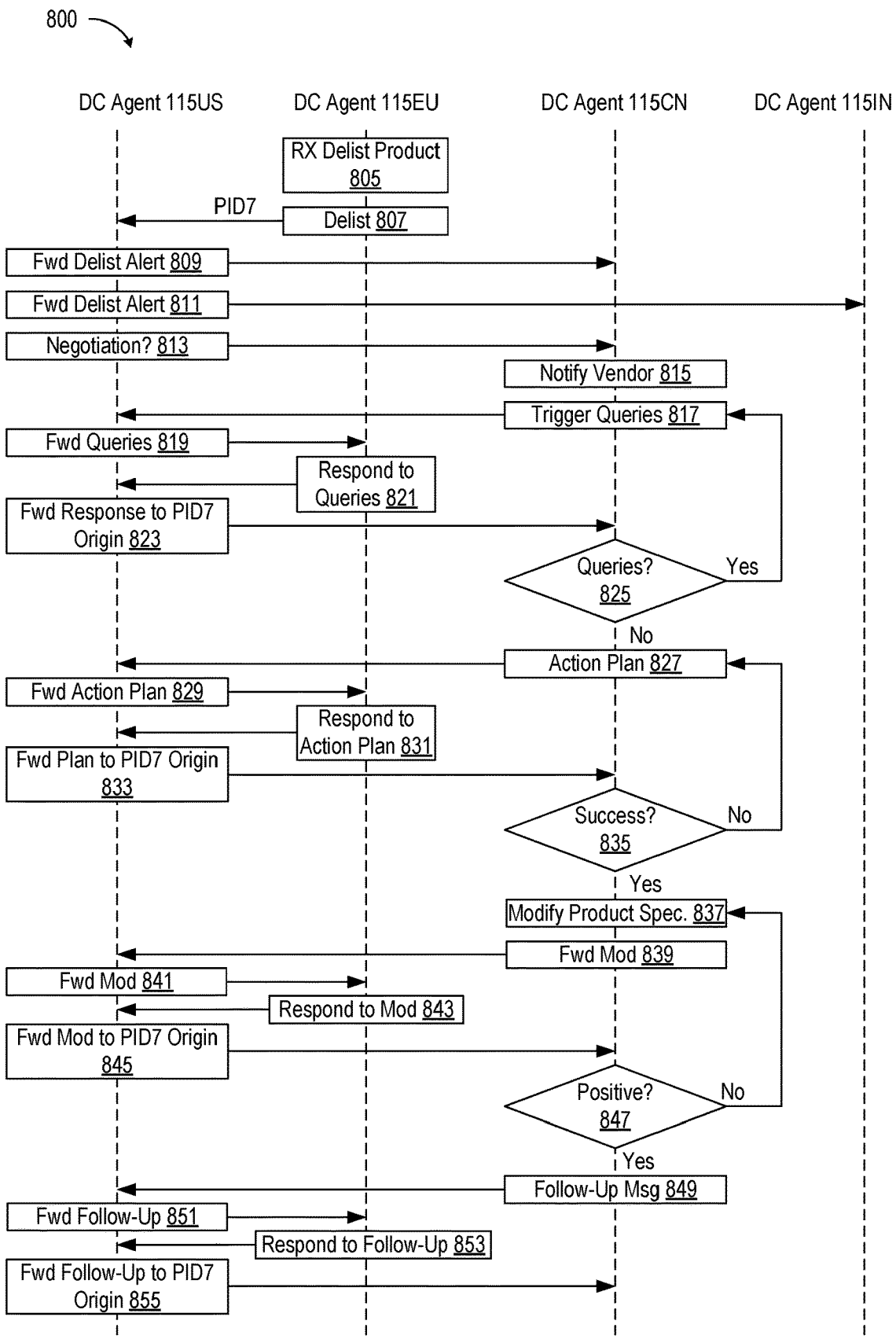
FIG. 8 depicts a delisting process 800 for DCs 105 arranged in a spoke-hub network in which DC agent 115US serves as a communication hub.

FIG. 8 depicts a delisting process 800 for DCs 105 arranged in a spoke-hub network in which DC agent 115US serves as a communication hub. European agent 115EU receives a message 805 requesting the delisting of a product PID7 offered for sale in each of the four illustrated regions (US, EU, CN, and IN) by a vendor in China via a Chinese DC 105CN. Agent 115EU delists the product from local product list 126EU and sends a message 807 notifying US agent 115US of the delisting. Agent 115US delists the product and, acting as hub, forwards delisting alerts 809 and 811 to the remaining DC agents 115CN and 115IN. Hub agent 115US also conveys to the origin DC 115CN an invitation 813 to negotiate the delisting.

Alert 813 inspires agent 115CN to notify the product's vendor the product's delisting (815). The notification can trigger queries 817 if the vendor is interested in understanding or reversing the delisting. Spoke agent 115US receives and forwards these queries (819) to agent 115EU, the entity that initiated the delisting. Hub agent 115US acts as a passive intermediary to facilitate the delisting process in consequence of the spoke-hub network and need not play a role in any negotiation.

Source agent 115EU can automatically or with administrative help issue a response 821 to the queries. Hub agent relays the response (823) to origin DC 115CN. Per decision 825, the system can iterate on queries and responses until the parties reach an understanding. Once the queries are exhausted, origin agent 115CN can message agent 115EU an action plan 827 for negotiating an end to the delisting. There being no direct communication channel to agent 115EU, action plan 827 is conveyed to hub agent 115US, which forwards the plan (829) to agent 115EU. The action plan of step 827 can include a requirement of product content modification according to the government policy or regulation, an agreement to modify the product specification or availability in conformance with the policy or regulation, a change in in-app purchase restrictions, etc.

Agent 115EU can review the action plan and respond (831) with suggestions for managing the issues, such as to modify the product or product description to address a regulatory problem. Hub agent 115US relays this response (833) to origin agent 115CN. Per decision 835, if the negotiation is successful agent 115CN can modify the product or product description (837) in the negotiated manner and forward the modified product or product description to hub agent 115US to be forwarded (841) to agent 115EU for review. If the response is negative, which is to say no agreement is reached, decision 847 returns to step 837 so that the negotiation can continue. If the negotiated change succeeds, agent 115CN follows up (849) with a request to determine when the modified product specification can be relisted. Hub agent 115US forwards this response (851) and agent 115EU responds (853) to agent 115CN via hub agent 115US (855). While not shown here, filter engine 124EU modifies the product distribution list 140EU to reverse the local delisting and messages hub DC 105US to do the same. Other DCs 105 can likewise be alerted to update their respective distribution lists whether the product is current on offer in their respective regions. Irrespective of any network used in e.g., peer-to-peer or spoke-hub, when a failure occurs during the selective synchronization process, the failed event is captured and cached in DC 105. A scheduler in e.g. marketplace module fetches the details of failed events from a local cache e.g. every 10 minutes and retries selective synchronization until the synchronization is successful and the data integrity is confirmed.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. The modules, routines, features, attributes, methodologies, and other aspects of the present disclosure can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, and not limiting. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A method of managing product distribution among a network of marketplace data centers, the network of marketplace data centers including a local marketplace data center and at least one remote marketplace data center, the method comprising:
    storing, within the local data center, a local-product list of local-product offerings and, for each of the local-product offerings, a local-product distribution list specifying distribution parameters of a product; and
    for each of the local-product offerings:
        crawling a website hosted on the remote marketplace data center for a remote-product offering of the product, the remote-product offering including information about the product; and
        updating the local-product distribution list to include the information about the product.

2. The method of claim 1, further comprising validating one of the offered products in the local-product distribution lists based on a regulation specific to a region of the remote marketplace data center.

3. The method of claim 1, further comprising updating the local-product distribution list to delist the one of the offered products from the local-product distribution lists.

4. The method of claim 1, further comprising finding a regulation specific to a region of the remote marketplace data center and remote from the local marketplace data center, updates at the at least one of the local-product distribution lists responsive to the regulation.

5. The method of claim 1, further comprising finding the remote-product offering of the product on the website hosted on the remote marketplace data center and communicating the updated local-product distribution list to the remote marketplace data center.

6. The method of claim 1, further comprising finding an omission of the remote-product offering of the product on the website hosted on the remote marketplace data center and removing the remote marketplace data center from the local-product distribution list.

7. The method of claim 1, further comprising updating one of the local-product distribution lists to delist at least one of the marketplace data centers.

8. The method of claim 7, further comprising sending the updated local-product distribution list to the marketplace data centers specified in the updated local-product distribution list.

9. The method of claim 7, further comprising sending the updated local-product distribution list to the marketplace data centers.

10. The method of claim 7, further comprising issuing a notice of the delisting and receiving a response to the notice.

11. The method of claim 10, further comprising negotiating a relisting of the at least one of the marketplace data centers responsive to the response to the notice.

12. The method of claim 1, wherein each marketplace data center resides within a region and the distribution parameters comprise the regions.

13. The method of claim 12, further comprising receiving, responsive to the crawling, a regulation specific to the region of the remote marketplace data center and relating to the remote-product offering of one of the products, and updating the local-product distribution list of the one of the products responsive to the regulation.

14. The method of claim 12, wherein one of the remote marketplace data centers is within a region subject to a regulation specific to the region, the method further comprising updating the local-product distribution list, responsive to the regulation, to delist the product from at least one of the marketplace data centers.

15. The method of claim 1, further comprising receiving a language designation responsive to the crawling and updating the local-product distribution list of at least one of the local-product offerings with the language designation.

16. The method of claim 1, further comprising receiving logistical information responsive to the crawling and updating the local-product distribution list of at least one of the local-product offerings with the logistical information.

17. The method of claim 1, wherein the crawling of the website of the remote marketplace data center for the remote-product offering of the product comprises reading a remote-product distribution list for the remote-product offering, and wherein updating the local-product distribution list comprises updating the local-product distribution list responsive to the remote-product distribution list.

18. The method of claim 1, wherein the products comprise media products.

19. The method of claim 18, wherein the media products comprise applications.

20. The method of claim 1, further comprising:
receiving user feedback responsive to the crawling, the user feedback including at least one of a user rating and a user review related to one of the local-product offerings; and
directing the user feedback to the local-product distribution list.

21. The method of claim 1, wherein one of the local-product offerings comprises an application, the method further comprising receiving an extension of the application responsive to the crawling.

22. The method of claim 1, wherein the network of marketplace data centers includes a primary data center and secondary data centers, the secondary data centers including the local marketplace data center, the method further comprising:
for at least one of the local-product offerings,
excluding the primary data center in the local product distribution list; and
reporting the updated local-product distribution list to the excluded primary data center.

23. The method of claim 22, further comprising sending the updated local-product distribution list to at least one of the secondary data centers specified in the updated local-product distribution list of the excluded primary data center.

24. The method of claim 23, further comprising sending user feedback from the excluded primary data center responsive to the updated product distribution list.

25. The method of claim 22, further comprising:
receiving user feedback at one of the secondary data centers, the user feedback related to one of the local-product offerings in the one of the secondary data centers;
sending the user feedback to the primary data center; and
sending the user feedback from the primary data center to others of the secondary data centers responsive to the updated product distribution list in the primary data center.

26. The method of claim 1, further comprising:
storing the local-product list in local storage;
storing, within a database in the local data center separate from the local storage, a second local-product list including the local-product offerings; and
synchronizing the database in the local data center with a remote database in the remote marketplace data center.

27. A local marketplace data center in communication with a remote marketplace data center, the local marketplace data center comprising:
computing resources with access to memory;
a marketplace module executing on the computing resources with the memory to offer products via a network, the marketplace module to receive and send, for each of the offered products, product metadata descriptive of the offered product, the product metadata including a local-product distribution list specifying distribution parameters for the offered product; and
an agent module executing on the computing resources with the memory to pass the product metadata to and from the marketplace module, the agent module communicatively coupled to the remote marketplace data center, the agent module to crawl a website of the remote marketplace data center for information about the offered products and update at least one of the local-product distribution lists with the information.

28. The local marketplace data center of claim 27, the agent module to receive an update to the metadata descriptive of one of the offered products, refer to the local-product distribution list specifying the distribution parameters for the one of the offered products, and issue update messages instructing the remote marketplace data centers to update their product metadata descriptive of the one of the offered products.

29. The local marketplace data center of claim 27, further comprising:
local storage to store the local-product distribution list in local storage;
a database separate from the local storage to store a second local-product list including the local-product offerings; and
a database management system to synchronize the database with a remote database in the remote marketplace data center.

* * * * *